United States Patent [19]
Gardner et al.

[11] Patent Number: 5,910,385
[45] Date of Patent: Jun. 8, 1999

[54] ELECTRICALLY CONDUCTIVE COMPOSITION AND ELEMENTS CONTAINING SOLUBILIZED POLYANILINE COMPLEX

[75] Inventors: Sylvia Alice Gardner; Lori Jeanne Shaw-Klein; Brian Kenneth Brady, all of Rochester, N.Y.

[73] Assignee: Eastman Kodak Company, Rochester, N.Y.

[21] Appl. No.: 08/918,167

[22] Filed: Aug. 25, 1997

Related U.S. Application Data

[62] Division of application No. 08/583,266, Jan. 5, 1996, Pat. No. 5,716,550.
[60] Provisional application No. 60/002,104, Aug. 10, 1995.

[51] Int. Cl.⁶ .............. G03C 1/89; G03G 5/10; B32B 9/04; B32B 9/02
[52] U.S. Cl. .............. 430/62; 430/69; 430/527; 430/529; 524/80; 524/104; 524/173; 524/379; 528/422; 528/423; 428/411.1; 428/478.8; 428/478.2; 428/480; 428/500; 428/511; 428/532; 428/535
[58] Field of Search .............. 430/527, 529, 430/69, 62; 428/411.1, 480, 478.2, 535, 500, 532, 478.8, 511; 524/80, 104, 173, 379; 528/422, 423

[56] References Cited

U.S. PATENT DOCUMENTS

| | | | |
|---|---|---|---|
| 3,963,498 | 6/1976 | Trevoy | 96/87 |
| 4,025,342 | 5/1977 | Trevoy | 96/1.5 |
| 4,025,463 | 5/1977 | Trevoy | 252/500 |
| 4,025,691 | 5/1977 | Trevoy | 428/411 |
| 4,025,704 | 5/1977 | Trevoy | 526/16 |
| 4,237,194 | 12/1980 | Upson et al. | 428/424.2 |
| 4,308,332 | 12/1981 | Upson et al. | 430/62 |
| 4,526,706 | 7/1985 | Upson et al. | 252/500 |
| 4,731,408 | 3/1988 | Jasne | 524/458 |
| 4,959,180 | 9/1990 | Armes et al. | 252/519 |
| 4,963,206 | 10/1990 | Shacklette et al. | 156/99 |
| 4,983,322 | 1/1991 | Eisenbaumer | 250/500 |
| 5,002,700 | 3/1991 | Otagawa et al. | 252/500 |
| 5,069,820 | 12/1991 | Jen et al. | 252/500 |
| 5,160,457 | 11/1992 | Elsenbaumer | 252/500 |
| 5,196,144 | 3/1993 | Smith et al. | 252/500 |
| 5,198,153 | 3/1993 | Angelopoulos et al. | 252/500 |
| 5,264,552 | 11/1993 | Abe et al. | 528/422 |
| 5,278,213 | 1/1994 | Han et al. | 524/233 |
| 5,324,815 | 6/1994 | Ohtani et al. | 528/422 |
| 5,364,751 | 11/1994 | Kurachi et al. | 430/527 |
| 5,370,825 | 12/1994 | Angelopoulos et al. | 252/500 |
| 5,382,494 | 1/1995 | Kudo et al. | 430/140 |
| 5,436,796 | 7/1995 | Abe et al. | 361/525 |
| 5,494,609 | 2/1996 | Kulkarni et al. | 252/500 |
| 5,510,168 | 4/1996 | Mori et al. | 428/141 |
| 5,540,862 | 7/1996 | Cao et al. | 252/500 |
| 5,626,795 | 5/1997 | Smith et al. | 252/500 |

FOREIGN PATENT DOCUMENTS

| | | | |
|---|---|---|---|
| 017717 | 10/1980 | European Pat. Off. | G03C 1/82 |
| 545729 | 6/1993 | European Pat. Off. | H01B 1/12 |
| 5003138 | of 0000 | Japan . | |
| 6028714 | of 0000 | Japan . | |
| 6124708 | of 0000 | Japan . | |
| 8120167 | of 0000 | Japan . | |
| 2/240139 | 9/1990 | Japan | C08G 73/00 |
| 2/282245 | 11/1990 | Japan | G03C 1/85 |
| 2/308160 | 12/1990 | Japan | G03C 1/89 |
| 2/308245 | 12/1990 | Japan | G03C 1/89 |
| 7/020611 | 1/1995 | Japan . | |
| 20072 | 11/1992 | WIPO | H01B 1/12 |
| 22911 | 12/1992 | WIPO | H01B 1/00 |
| 05519 | 3/1993 | WIPO | H01B 1/12 |
| 15510 | 8/1993 | WIPO | H01B 1/12 |

*Primary Examiner*—Richard L. Schilling
*Attorney, Agent, or Firm*—J. Lanny Tucker

[57] ABSTRACT

Electrically conductive elements, such as imaging elements, can be prepared by applying electrically conductive coating compositions to a suitable support. The coating compositions include a polyaniline-protonic counter-ion complex in a first solvent that has certain Hansen solubility parameters, and a film-forming binder in a second common coating solvent. The total solids in the coating composition is less than or equal to about 10 weight %, and the weight ratio of the binder to the complex is at least about 1:1. Under these formulation conditions, the polyaniline protonic counter-ion complex is solubilized, rather than being in dispersed form, and is readily applied to form a thin, relatively transparent, electrically conductive film. Antistatic layers of photographic elements can be prepared in this manner.

26 Claims, No Drawings

ELECTRICALLY CONDUCTIVE COMPOSITION AND ELEMENTS CONTAINING SOLUBILIZED POLYANILINE COMPLEX

This application is a divisional of Ser. No. 08/583,266 filed Jan. 5, 1996, now U.S. Pat. No. 5,716,550 and Provisional application Ser. No. 60/002,104 filed Aug. 10, 1995.

FIELD OF THE INVENTION

This invention relates in general to electrically conductive elements including imaging elements, such as photographic, electrophotographic, and thermal imaging elements, comprising an electrically conductive layer. More particularly, this invention relates to imaging elements comprising an electrically conductive layer that is composed of a solubilized polyaniline antistatic agent. This invention also relates to an electrically conductive coating composition useful in preparing these elements.

BACKGROUND OF THE INVENTION

Interest in electrical conductivity has increased in recent years in order to provide electrically conductive layers on various articles or elements. Work has intensified with emphasis on polymers having extended configuration in the backbone chain. One conjugated polymer system currently under considerable investigation include unsubstituted or substituted polyanilines, as noted in WO 92/22911 (published Dec. 23, 1992).

Problems associated with the formation and discharge of electrostatic charge during the manufacture or use of imaging elements have been recognized for many years by workers in the imaging arts. The accumulation of charge on imaging elements leads to the attraction of dust which can cause defects. Additionally, the discharge of accumulated charge during or after the application of imaging layers, such as photographic emulsion layers, can produce irregular fog patterns or "static marks" in the layer, as well as repellency spots and other undesirable defects. The severity of static problems has increased due to new emulsions of increased sensitivity, dramatic increase in coating speeds and post-drying efficiencies. The instances in which static charge can be accumulated and discharged during manufacturing, packaging, storage, and use are innumerable, and a solution to this problem has been actively sought in the industry for many years.

It is generally known that electrostatic charge can be dissipated effectively by incorporating one or more electrically conductive layers in an imaging element. Such antistatic layers can be applied to either or both sides of the element, over or under imaging layers, and on the same or different side of the support as the imaging layers. For some applications, an antistatic agent can be incorporated into the imaging layer, or into the support, or into both.

The requirements of antistatic layers in silver halide photographic films is especially demanding because of the stringent optical requirements. Other types of imaging elements such as photographic papers and thermal imaging elements also frequently require the use of an antistatic layer, but the requirements are less stringent.

Electrically conductive layers are also commonly used in imaging elements for purposes other than providing static protection. For example, in electrostatographic imaging, it is well known to use imaging elements comprising a support, an electrically conductive layer that serves as an electrode, and a photoconductive layer that serves as the image-forming layer.

A wide variety of materials can be used as antistatic agents in various locations in the element. Most of the traditional antistatic layers comprise ionic conductors. Thus, charge is transferred in ionic conductors by the bulk diffusion of charged species through an electrolyte. The prior art describes numerous simple inorganic salts, alkali metal salts or surfactants, ionic conductive polymers, polymeric electrolytes containing alkali metal salts, colloidal metal sols, metal halides mixed in an organic polymer matrix or a matrix of a colloidal inorganic colloid such as silica. Conductivity of most antistatic agents is generally strongly dependent upon temperature and relative humidity of the environment as well as the moisture in the antistatic layer. Simple inorganic salts are usually leached out of antistatic layers during processing, thereby lessening their effectiveness.

Antistatic layers employing electronic conductors have also been described in the art. Because the conductivity depends predominantly upon electronic mobilities rather than ionic mobilities, the observed electronic conductivity is independent of relative humidity and other environmental conditions. Such antistatic layers can contain conjugated polymers, metal oxides, doped metal oxides, conductive carbon particles or semi-conductive inorganic particles. While such materials are less affected by the environment, a lengthy milling process is often required to reduce the particle size range of oxides to a level that will provide a transparent antistatic coating needed in most imaging elements. Additionally, the resulting coatings are abrasive to finishing equipment.

It is also known to prepare antistatic layers from electronically conductive polymers. Various polymer dispersions have been prepared as "loaded" or sorbed in latex polymers (see U.S. Pat. No. 4,237,194 of Upson et al). The resulting semiconductor-loaded polymer dispersion can then be coated on a variety of photographic supports. However, such layers have a slightly green color, and are therefore objectionable for many applications. Moreover, these materials will not survive processing with various photographic processing solutions unless they are protected by impermeable overcoats.

Blends of polyanilines with other polymers, or polyaniline dispersions in organic solvents, are described in numerous references, including WO 89/02155 (published Mar. 9, 1989). However, such materials are not useful for photographic elements because they provide highly colored coatings, low conductivity or both, and have poor solution processibility. Additional art describes colloidal dispersions of polyanilines, but the polymers are generally not soluble in water or common organic coating solvents.

Dispersions of polyaniline and a protonic acid such as toluenesulfonic acid are described in Japanese Kokai 02/282245 (Fuji) for use as antistatic compositions. Such dispersions can be prepared by mixing a commercially available "Conductive Paint" (available from Americhem, Cuyahoga Falls, Ohio) with one or more binder materials (such as polymethyl methacrylate, polyethyl methacrylate, polycarbonates, cellulose esters, polyvinylformal or blends thereof) in suitable organic solvents. The formulations, at 2–5% solids, can be coated on conventional polymeric supports to provide electrically conductive layers. Moreover, such layers can be overcoated if desired.

It is also known that organic solvent soluble polyanilines can be produced by the use of selected protonic acids to protonate the polyaniline [see for example, WO 92/20072 (published Nov. 12, 1992), WO 92/22911 (published Dec.

23, 1992), WO 93/05519 (published Mar. 18, 1993), WO 93/15510 (published Aug. 5, 1993), EP-A-0 545 729 (published Jun. 9, 1993), U.S. Pat. No. 4,983,322 (Eisenbaumer), and U.S. Pat. No. 5,196,144 (Smith et al)]. The solvents or mixtures of solvents described for these materials are not generally useful in coating processes used in the preparation of imaging elements either for environmental or cost reasons.

Hence, there remains a need for solubilized conductive polyanilines that can be applied to imaging and other types of elements directly from water or other acceptable common coating solvents in low coverages to provide effective electrically conductive layers.

SUMMARY OF THE INVENTION

The problems noted above are overcome with an electrically conductive coating composition comprising a solution of:

a) a complex of a polymeric polyaniline and a protonic acid that has a counter-ion that imparts conductivity to the composition, the complex being dissolved in a first solvent that has a Hansen polar solubility parameter of from about 12 to about 18 $MPa^{1/2}$, and a Hansen hydrogen bonding solubility parameter of from about 5 to 14 $MPa^{1/2}$, and b) a film-forming binder dissolved in a second solvent, provided that the total solids in the composition is less than or equal to about 10 weight %, and the weight ratio of the binder to the complex is at least about 9:1.

This invention also provides an electrically conductive element comprising a support and having thereon in at least one region, an electrically conductive layer formed from application of the electrically conductive coating composition described above, the electrically conductive layer being present on the support at a dry coverage of at least 150 $mg/m^2$.

Further, an imaging element comprises a support having thereon:

one or more imaging layers, and on the same, opposite or both sides of the support, an electrically conductive layer formed from application of the electrically conductive coating composition described above, the electrically conductive layer being present on the support in each instance at a dry coverage of at least 200 $mg/m^2$.

The present invention provides an advance in the art with an electrically conductive coating composition that can be applied to various articles or supports out of common coating solvents. The coating composition comprises a unique combination of a polyaniline protonic acid complex that is solubilized in a particular first solvent having specific Hansen solubility parameters. This solution is then mixed with a compatible solution of film-forming binder in a second solvent that is a common coating solvent. With critical percent solids, and binder to polyaniline complex ratios, the coating composition can be applied directly to the support at a suitable thickness to form highly conductive layers. A wide variety of film-forming binders can be used to provide various properties. The dried electrically conductive coating composition is also highly abrasion and process resistant. It can be readily used as an undercoat or overcoat, and can be overcoated itself. In a particularly useful embodiment, the layer can also contain ferromagnetic particles to provide magnetic recordability.

DETAILED DESCRIPTION OF THE INVENTION

The electrically conductive elements of this invention can be used for many purposes. They can be conductive papers, films, fabrics, ceramics, metals, glasses, electrodes and fibers that are useful in a variety of industries. For example, they can be used in microprocessors, infrared and microwave absorbing shields, conductive bearings, and electrically conductive connectors, on floor surfaces, as spray finishings, coated fabrics, antistatic finishes for CRT screens, windows and other articles readily apparent to one skilled in the art. Such elements or articles have appropriate metal, glass, ceramic, plastic, fabric, or paper supports on which one or more of the electrically conductive coatings are disposed.

The elements of the present invention are particularly useful as imaging elements of many types. Such elements include, but are not limited to, photographic, electrostatographic, electrographic, electrophotographic, photothermographic, migration, electrothermographic, dielectric recording and thermal dye transfer imaging elements. Photographic silver halide elements are preferred.

The imaging elements of this invention can have any of the necessary or optional layers conventionally used in the art for the various types of elements. Extensive details of such layers will not be provided here since they are well known in the art.

For example, in electrostatography, an image comprising a pattern of electrostatic potential (also referred to as an electrostatic latent image) is formed on an insulative surface by any of several methods. For example, the electrostatic latent image may be formed electrophotographically (that is by imagewise radiation-induced discharge of a uniform potential previously formed on a surface of an electrophotographic element comprising at least a photoconductive layer and an electrically-conductive substrate), or it may be formed by dielectric recording (that is by direct electrical formation of a pattern of electrostatic potential on a surface of a dielectric material). Typically, the electrostatic latent image is then developed into a toner image by contacting the latent image with an electrographic developer (if desired, the latent image can be transferred to another surface before development). The resulting toner image can then be fixed in place on the surface by application of heat or pressure or other known methods (depending upon the nature of the surface and of the toner image) or can be transferred by known means to another surface, to which it then can be similarly fixed.

In many electrostatographic imaging processes, the surface to which the toner image is intended to be ultimately transferred and fixed is the surface of a sheet of plain paper or, when it is desired to view the image by transmitted light (for example, by projection in an overhead projector), the surface of the transparent film sheet element.

In electrostatographic elements, the electrically conductive layer can be a separate layer, a part of (embedded within, or a region thereof) the support layer or comprise the support layer itself. There are many types of conductive layers known in the electrostatographic art, the most common being metallic laminates (such as an aluminum-paper laminate), metal plates (such as aluminum, copper, zinc or brass), metal foils (such as aluminum or zinc foils), vapor deposited metal layers (such as silver, aluminum or nickel), semiconductors dispersed in resins such as polyesters as described in U.S. Pat. No. 3,245,833, and electrically conductive salts such as described in U.S. Pat. No. 3,007,801 and U.S. Pat. No. 3,267,807.

Thermally processable imaging elements, including films and papers, for producing images by thermal processes are well known. These elements include thermographic elements in which the image is formed by imagewise heating the element. Such elements are described in, for example, *Research Disclosure* June 1978, Publication 17029, U.S. Pat. No. 3,457,075, U.S. Pat. No. 3,933,508 and U.S. Pat. No. 3,080,254.

Photothermographic elements typically comprise an oxidation-reduction image-forming combination that contains an organic silver salt oxidizing agent, preferably a silver salt of a long-chain fatty acid, that are resistant to darkening upon illumination. Preferred organic silver salt oxidizing agents are silver salts of long-chain fatty acids containing 10 to 30 carbon atoms.

Further details of photothermographic elements, and details of migration imaging processes and elements, thermal dye transfer elements and systems are well known in the art and are described for example, in U.S. Pat. No. 5,340,676 (Anderson et al) and U.S. Pat. No. 5,368,995 (Christian et al), incorporated herein by reference, and references cited therein.

While the invention is not to be interpreted as so limited, the remainder of the detailed description of this invention will be directed to the preferred photographic elements. But it would be understood that the details of the electrically conductive coating compositions in photographic elements could be readily adapted to other types of elements or articles by one skilled in the art using the teaching provided herein as well as that provided in extensive literature.

Photographic elements provided with an electrically conductive layer according to this invention can differ widely in structure and composition. For example, they can vary greatly with regard to the type of support, the number and composition of image-forming layers, and the kinds of auxiliary layers that are included in the elements. In particular, the elements can be still films, motion picture films, x-ray films, graphics arts films, paper prints or microfiche. They can be black and white elements (films or papers), color elements (films or papers) adapted for use in negative-positive process, or color films adapted for use in a reversal process.

A detailed description of such materials is found, for example, in *Research Disclosure*, publication 36544, pages 501–541 (September, 1994). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "*Research Disclosure*". More details about such elements are provided hereinbelow.

The elements contemplated in the practice of this invention comprise a double-sided, generally flat support that is composed of a material that is inert to water and most common organic solvents. Generally, such materials are natural or synthetic polymeric films (homogeneous, blends or composites), metals, glasses or cellulosic papers (included resin-coated and uncoated papers). Such materials are prepared using conventional materials and procedures. Polymeric films and resin-coated papers are the most likely supports used in the practice of this invention.

Photographic papers are one class of useful elements, the details of which are provided, for example, in *Research Disclosure*, supra, paragraphs XV(5) & (6) and references noted therein. The paper supports can be subbed or unsubbed, and may contain conventional pigments, UV absorbers, sizing agents and other materials readily apparent to one skilled in the art.

Thus, the imaging elements of this invention can have any suitable support prepared from a wide variety of materials. Representative supports can be prepared from homogeneous materials that include, but are not limited to, cellulose nitrate, cellulose esters (such as cellulose triacetate, cellulose diacetate, cellulose propionate, cellulose butyrate, and cellulose acetate propionate), poly(vinyl acetal), polyesters of dibasic aromatic carboxylic acids with divalent alcohols (such as polyethylene terephthalate, polyethylene naphthalate, poly-1,4-cyclohexanedimethylene terephthalate, polyethylene 1,2-diphenoxyethane-4,4'-dicarboxylate, and polybutylene terephthalate), polyamides (such as nylons), homo- and copolymers of vinyl chloride, polycarbonates, homo- and copolymers of styrene, polyolefins (such as high and low density polyethylene and polypropylene), polyacrylates, polyimides, papers (uncoated and resincoated), glasses, metals, and others well known in the art.

Particularly useful photographic film supports are prepared from polyesters such as polyethylene terephthalate, polyethylene naphthalate, poly-1,4-cyclohexanedimethylene terphthalate, polyethylene 1,2-diphenoxyethane-4,4'-dicarboxylate and polybutylene terephthalate. Polyethylene terephthalate and polyethylene naphthalate are most preferred.

Polymeric film supports can be prepared using conventional techniques and starting materials, and can contain any of the conventional addenda included for various purposes, including but not limited to, antioxidants, plasticizers, dyes, UV absorbers and pigments, as described for example in *Research Disclosure,* supra, paragraph XV(8) and references noted therein. They can be transparent or opaque depending upon how they are to be used. The supports can be surface treated by various processes including, but not limited to, corona discharge, glow discharge, UV exposure, solvent washing or overcoating with one or more subbing layer materials as is commonly known in the photographic art (such as vinylidene chloride copolymers, or glycidyl acrylate or methacrylate copolymers).

The photographic element contains one or more radiation sensitive layers, such as photographic silver halide layers, and one or more interlayers, overcoats, subbing layers, antihalation layers, magnetic recording layers, and electrically conductive layers prepared from the electrically conductive coating compositions described herein in addition to conventional electrically conductive coating compositions already known in the art. In addition, one or more layers can serve dual functions. For example, the electrically conductive (or. antistatic) layer can also be a magnetic recording layer. Still again, the electrically conductive layer can be composed of materials such that it can act as the support as well, or be "sandwiched" between the same or different support materials (such as in co-extrusion processes). These features are well known to one skilled in the photographic art.

It is also preferred that where the support is a polymeric film, the film support is annealed at some point using conventional annealing techniques. It is also preferred that the photographic element have multiple photographic silver halide emulsion layers, a magnetic recording layer and a lubricant layer over the magnetic recording layer. The electrically conductive layer can be in any suitable location in such elements, such as on the opposite, same or both sides of the element as the magnetic recording layer or imaging layers. In one embodiment, the magnetic recording layer is over the electrically conductive layer which is directly or indirectly applied to the support. In another embodiment, the magnetic recording layer is underneath the electrically conductive layer. The various possibilities of layer arrangements would be readily apparent to one skilled in the photographic arts.

Thus, in one embodiment of this invention, a photographic element comprises a photographic film support having on one side thereof: an antistatic layer formed from an electrically conductive coating composition of this invention and a magnetic recording layer (in either order on the support), and on the other side, multiple silver halide emulsion layers and one or more overcoats, antihalation layers, subbing layers and interlayers.

In still another embodiment, the electrically conductive composition can be incorporated into a magnetic recording layer on one side of a support of an element having radiation sensitive layers (such as photographic emulsion layers) on the other side of the support.

The various layers applied to the support to form a photographic element are generally well known in the art. For example, the radiation sensitive layers (such as photographic silver halide layers), their composition and methods of formulation are well known, being described for example, in Research Disclosure, supra and the hundreds of references described therein. The emulsions in such layers can be composed of silver halides including, but not limited to, silver chloride, silver bromide, silver bromochloride, silver bromoiodide, silver chlorobromide, silver bromochloroiodide and others readily apparent to one skilled in the art. Some useful emulsions are considered "high chloride" emulsions meaning that at least 80 mol % of the silver halide is silver chloride. Other useful emulsions contain little or no silver chloride, and thus are predominantly silver bromide or silver bromoiodide emulsions. The emulsion grains can have any useful morphology including the well known "tabular grain morphology".

The noted *Research Disclosure*, supra, also describes useful subbing layers, antihalation layers, interlayers, overcoats, coating techniques, dispersion processes, and a wide range of materials, embodiments and preparatory procedures. The teaching of *Research Disclosure*, supra, is incorporated herein by reference in its entirety for its teaching of such photographic materials.

Formulations for preparing magnetic recording layers are also well known in the art, as described for example, in U.S. Pat. No. 5,395,743 (Brick et al) and U.S. Pat. No. 5,397,826 (Wexler), both incorporated herein by reference. Extensive details of such layers are found in these references, but a general description is included herein because of the preference for such layers in the elements of this invention.

The magnetic recording layers generally include a dispersion of ferromagnetic particles in a suitable binder. Preferably, the binder is transparent so the layer is transparent, but this is not essential. As might be expected, it is highly desirable that the magnetic recording layer not only exhibit desired magnetic and photographic performance, but that it also be highly durable, abrasion resistant and scratch resistant.

Suitable ferromagnetic particles would be readily apparent to one skilled in the art. They include, but are not limited to, ferromagnetic iron oxides (such as $\gamma$-$Fe_2O_3$ or $Fe_3O_4$) with or without cobalt, zinc or other metals in solid solution or surface treated, ferromagnetic chromium dioxides with or without metallic elements or halogen atoms in solid solution. Ferromagnetic metal pigments with an oxide coating on their surface to improve their chemical stability or to improve dispersibility as is commonly employed in conventional magnetic recording, may also be used if desired. In addition, magnetic oxides with a thicker layer of lower refractive index oxide or other material having a lower optical scattering cross-section can be used. Cobalt doped $\gamma$-iron oxide is the preferred ferromagnetic material useful in the practice of this invention.

The magnetic recording layer typically contains one or more transparent binders, dispersants-cobinders, optional non-magnetic particulate materials, grind solvents, coating aids, surfactants, crosslinking agents, catalysts, and other conventional addenda for such layers. The amounts and proportions of the various components of such layers are also known in the art. Generally, amount of magnetic particles in a coating composition of this invention is up to about 5%, and from about 2 to about 4% is preferred.

The electrically conductive coating compositions of this invention include a solubilized polyaniline protonic counterion complex. By "solubilized" is meant that the complex is present in a continuous phase (that is, dissolved) rather than as a dispersed particulate phase as is common in many prior art compositions.

Polyanilines are described in considerable detail in WO 92/22911 (noted above) and U.S. Pat. No. 4,983,322 (Eisenbaumer) and various references cited therein.

One or more polyanilines are included in the composition of this invention. As used herein, the term "polyaniline" refers generically to substituted or unsubstituted polyanilines, unless the context is clear that only one type is meant. In general, polyanilines are polymers and copolymers having sufficient molecular weight to exhibit suitable electrical conductivity, that is having a number average molecular weight of more than about 1000 daltons. In general, the polyanilines will be of at least 8 repeating units.

The polymers are derived from one or more substituted or unsubstituted anilines having the structure (I):

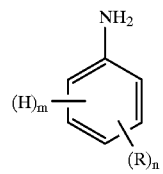

wherein R is the same or different at each occurrence and is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo or cyano, or any two R groups, taken together, are an alkylene group or alkenylene group completing a 3- to 7-membered aromatic or alicyclic ring fused to the central ring of structure I, and having carbon, nitrogen, sulfur or oxygen atoms or a sulfinyl group, m is an integer of from 1 to 5, and n is an integer of from 0 to 4, provided that the sum of m and n is 5.

Without intending to limit the scope of this invention, the size of the various R groups identified above for structure I ranges from 1 carbon atom (such as for alkyl or alkoxy) through 2 or more carbon atoms (such as for alkenyl) up through about 20 carbon atoms, with the total R groups on a given molecule having a total of about 40 carbon atoms. The various R groups can be unsubstituted or substituted, branched or linear, with various suitable groups that will not interfere with the molecule's properties (such as polymerizability, solubility, ionic nature of complex). Obviously, one skilled in the art would understand which groups can be substituted (such as alkyl, aryl and the like), and which cannot (such as nitro, cyano or halo). Representative substituents include, but are not limited to, halo (chloro or bromo), nitro, cyano, carboxy, epoxy, sulfo, aryl and other monovalent radicals readily apparent to one skilled in the art.

In structure I, m is an integer of from 1 to 5. Preferably, m is 5. Also, n is an integer of from 0 to 4, and preferably, it is 0. The sum of m and n is 5 in any case.

Representative polyanilines useful in the practice of this invention are shown in structures Ia–Id below:

(Ia):

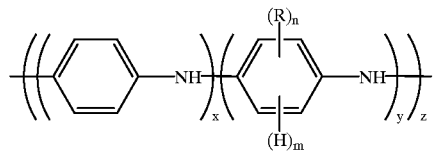

(Ib):

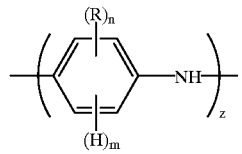

(Ic):

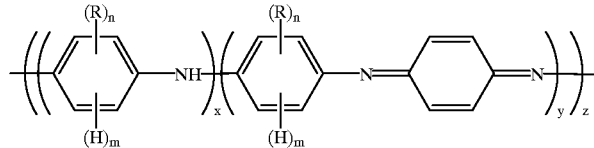

(Id):

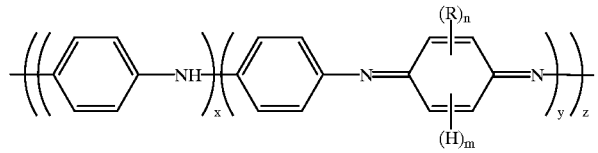

wherein m, n and R are as defined above, except that m is reduced by 1 as a hydrogen is replaced with a covalent bond in the polymerization, and thus, the sum of m and n is 4. Moreover, in structures Ia–Id, y is an integer equal to or greater than 0, x is an integer equal to or greater than 1, provided that the sum of x and y is greater than 1, and z is an integer equal to or greater than 1.

Representative R groups for the structures identified above include, but are not limited to, alkyl (such as methyl, chloromethyl, sulfomethyl, ethyl, isopropyl, sec-butyl, octyl, benzyl and dodecyl), alkenyl (such as 1-propenyl, 1-butenyl, 1-pentenyl, 2-pentenyl, 1-hexenyl and 3-hexenyl), alkoxy (such as methoxy, ethoxy, propoxy, butoxy, isopropoxy, pentoxy, nonoxy, octoxy and t-butoxy), aryloxy (such as phenoxy and p-chlorophenoxy), cycloalkenyl (such as cyclohexenyl and cyclopentenyl), alkanoyl (such as ethanoyl, propanoyl, butanoyl, pentanoyl and octanoyl), alkylsulfinyl (such as methylsulfinyl, ethylsulfinyl, isopropylsulfinyl and benzylsulfinyl), arylsulfinyl (such as phenylsulfinyl and naphthylsulfinyl), alkylsulfonyl (such as methylsulfonyl, ethylsulfonyl, benzylsulfonyl and nonylsulfonyl), aryl (such as phenyl and naphthyl), arylsulfonyl (such as phenylsulfonyl, tolylsulfonyl, naphthylsulfonyl), alkylthio (such as methylthio, ethylthio, isopropylthio, t-butylthio, hexylthio and benzylthio), arylthio (such as phenylthio, xylylthio, phenethylthio and naphthylthio), alkoxycarbonyl (such as methoxycarbonyl, ethoxycarbonyl, butoxycarbonyl and isopropoxycarbonyl), cycloalkyl (such as cyclopentyl, cyclohexyl, 4-methylcyclohexyl and cyclooctyl), alkoxyalkyl (such as methoxymethylene, ethoxymethyl, butoxymethyl, propoxyethyl, pentoxybutyl and methoxybenzyl), aryloxycarbonyl (such as phenoxycarbonyl), aryloxyalkyl and aryloxyaryl (such as phenoxyphenyl, phenoxymethylene and xylyloxyethyl), alkylthioalkyl (such as methylthiomethylene), alkylaryl (such as p-methylphenyl, xylyl and toluyl), and any of the foregoing groups substituted with one or more hydroxy, amino, halo, nitro, cyano or epoxy groups. Also, R can be a sulfo or carboxy terminated alkyl or aryl group, such as ethylsulfonic acid, propylsulfonic acid, benzylsulfonic acid, benzylcarboxylic acid, phenylsulfonic acid and others readily apparent to one skilled in the art.

Also useful as R groups are divalent moieties formed from any two R groups such as moieties of the formula:

wherein r is an integer of from 1 to 5, to complete a 3- to 7-membered aromatic or alicyclic ring, such moieties optionally having one or more oxygen, nitrogen or sulfur atoms or a sulfinyl group in the chain. In addition, the divalent moieties can have one or more unsaturated bonds.

Preferred for use in the practice of this invention are polyanilines of the structures Ia–Id noted above wherein:

m is 3 to 5 and n is 0 to 2 provided that their sum is equal to five,

R is a substituted or unsubstituted alkyl or alkoxy group having from 1 to 12 carbon atoms, cyano, halo or an alkyl group substituted with one or more sulfo or carboxy groups, x is an integer equal to or greater than 1, y is an integer equal to or greater than 0, provided that the sum of x and y is greater than 4, and z is an integer equal to or greater than 5.

More preferred are the polyanilines of the noted structures Ia–Id in which:

m is an integer of 3 to 5, n is 0 to 2 provided that their sum is 5,

R is a substituted or unsubstituted alkyl or alkoxy group having from 1 to 4 carbon atoms, or an alkyl group substituted with carboxy or sulfo groups, x is an integer equal to or greater than 1, y is an integer equal to or greater than 0, provided that the sum of x and y is greater than 6, and z is an integer equal to or greater than 10.

Most preferred embodiments are those in which m is 4 or 5, n is 0 or 1, R is a substituted or unsubstituted alkyl or alkoxy group of 1 to 4 carbon atoms, x is an integer equal to or greater than 2, y is an integer equal to or greater than 1, provided that the sum of x and y is greater than 8, and z is an integer equal to or greater than 15.

Useful substituted and unsubstituted anilines used to prepare the polyanilines include, but are not limited to, aniline, o-toluidine, m-toluidine, o-ethylaniline, m-ethylaniline, o-ethoxyaniline, m-butylaniline, m-hexylaniline, m-octylaniline, 4-bromoaniline, 2-bromoaniline, 3-bromoaniline, 3-acetamidoaniline, 4-acetamidoaniline, 5-chloro-2-methoxyaniline, 5-chloro-2-ethoxyaniline, 2,5-dimethylaniline, 2,3-dimethylaniline, 2,5-dibutylaniline, 2,5-dimethoxyaniline, tetrahydronaphthylamine, o-cyanoaniline, 2-thiomethylaniline, 3-(n-butanesulfonic acid)aniline, 2,4-dimethoxyaniline, 4-mercaptoaniline, 4-methylthioaniline, 3-phenoxyaniline and 4-phenoxyaniline. Aniline is most preferred.

Any form of the polyanilines can be conveniently used in the practice of this invention. Illustrative useful forms are those described in Green et al *J.Chem.Soc.*, 101, 1117 (1912) and Kobayahsi et al, *J.Electroanal.Chem.*, 177, 281–91 (1984). For example, the leucoemeraldine, protoemeraldine, emeraldine, nigraniline and toluprotoemeraldine forms can be used. Other useful forms may be discovered in the future.

Useful polyanilines can be prepared using chemical and electrochemical synthetic procedures, both procedures presently known as well as those discovered in the future. For example, one form of polyaniline having at least 160 repeating units can be prepared by treating aniline with ammonium persulfate in excess hydrogen chloride. This powdered form of polyaniline is blue green in color. Green et al describes other procedures for preparing various chemical forms of polyaniline. Synthetic procedures are also described in U.S. Pat. No. 4,983,322 and WO 92/22911, both noted above.

Useful forms of polyaniline can also be prepared by electrochemical oxidation of aniline in aqueous fluoroboric acid electrolyte on a platinum foil anode, or by vapor deposition of emeraldine base and subsequent exposure to an oxidizing dopant (protonic acid, defined below), described for example, by Dillingham et al, *J.Vacuum Sci.& Tech. A*, 12(4), pages 2436–2440 (1994).

Preferred chemical synthetic methods are illustrated below prior to the examples.

A second essential component of the solubilized polyaniline complexes useful in this invention is what is known in the art as a "protonoic acid" or oxidizing dopant" that protonates the polyaniline to form a charge transfer complex having an electrical conductivity equal to or greater than about $1 \times 10^{-4}$/ohm-cm (or a surface resistivity of at most about $1 \times 10^{8}$ ohms/square in coated form). Preferred protonic acids form complexes having an electrical conductivity of at least about $1 \times 10^{-2}$/ohm-cm (surface resistivity of at most about $1 \times 10^{6}$ ohms/square in coated form), and the most preferred complexes have an electrical conductivity of at least about $1 \times 10^{-1}$/ohm-cm (at most about 10 ohms/square surface resistivity).

Protonic acids are well known in the art, as described for example, in U.S. Pat. No. 4,983,322, WO 92/22911 and WO 93/15510 and references cited therein. They may display absorbance in the spectral range of from about 200 to about 800 nm, but preferably, they are colorless. A mixture of protonic acids can be used if desired.

Moreover, it is preferred that the protonic acid be "functionalized" meaning that it is soluble with or miscible in (as opposed to merely dispersible in) the first and second solvents and film-forming binders defined in more detail hereinbelow.

In general, the protonic acids useful herein have any of the structures II:

$$A\text{-}R^1$$

III:

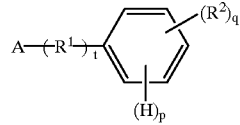

or

IV:

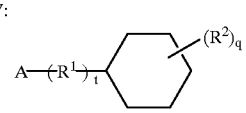

wherein A is sulfonic acid (or sulfo).

$R^1$ is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo or cyano, or a 3- to 7-membered heterocyclic ring having carbon and one or more nitrogen, sulfur or oxygen atoms (3 to 7 total atoms) in the ring nucleus. Each of the aliphatic groups can have up to 20 carbon atoms, can be branched or linear and may have one or more double bonds. The heterocyclic rings can be, for example, pyrolyl, furanyl or pyridinyl rings. Any of these groups can have one or more -sulfo, carboxy, cyano, nitro, halo, diazo or epoxy substituents.

Alternatively, $R^1$ can be a polymeric backbone from which depend a plurality of sulfo groups "A". Examples of polymeric acids include, but are not limited to, sulfonated polystyrene, sulfonated polyethylene and others readily apparent to one skilled in the art. In such cases, the polymer backbone can be selected to have solubility in given binders and/or solvents.

$R^2$ is the same or different at each occurrence and is an alkyl group, an alkenyl group, an alkoxy group, a cycloalkyl group, a cycloalkenyl group, an alkanoyl group, an alkylthio group, an aryloxy group, an alkythioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an aryloxycarbonyl group, an arylsulfonyl group, carboxy, halo, oxo or cyano.

Additionally, $R^2$ can be a divalent aliphatic group bonded to two different, nonadjacent carbon atoms of the central ring to complete an aromatic or alicyclic ring fused to the central ring of structure III or IV, and having carbon, nitrogen, sulfur or oxygen atoms or a sulfinyl group. For example, $R^2$ be propylene bonded to the opposing carbon atoms of the ring through the middle carbon atom, to form a camphene ring.

$R^2$ generally has from 1 to 20 carbon atoms, and can be branched, linear, saturated or unsaturated as one skilled in the art would understand for a given aliphatic group. $R^2$ preferably has from 3 to 20 carbon atoms, and more preferably it has from 8 to 20 carbon atoms, as well as optional heteroatoms as noted above. $R^2$ can also be substituted with one or more sulfo, carboxy, halo, cyano, nitro, diazo or epoxy groups.

R' is an alkylene group of 1 to 10 carbon atoms (branched or linear) and can be substituted as described above. Preferably, R' is methylene or ethylene. Also, t is 0 or 1.

In structures III and IV above (where appropriate), p is an integer of from 1 to 5, and q is an integer of from 0 to 4, provided that the sum of p and q is 5 (in structure III). More preferably, p is from 2 to 4, and q is 1 or 2.

In preferred embodiments relating to structures II, III and IV, A is sulfonic acid, $R^1$ is an alkyl group, an alkenyl group, an alkoxy group, an alkanoyl group, an alkylthioalkyl group, each having from 5 to 16 carbon atoms, or an alkylaryl group, an arylalkyl group, an alkylsulfinyl group, an alkoxyalkyl group, an alkylsulfonyl group, an alkoxylcarbonyl group, or carboxy wherein the alkyl or alkoxy group has from 1 to 20 carbon atoms (more preferably from 3 to 20 carbon atoms), or an alkyl group having 3 to 20 carbon atoms having one or more sulfo, carboxy, halo, nitro, cyano, diazo or epoxy substituents. $R^2$ is the same or different at each occurrence and is an alkyl group, an alkenyl group, an alkoxy group, an arylalkyl group, an alkylsulfonyl group, an alkoxycarbonyl group or a carboxy group having from 3 to 20 carbon atoms, oxo or an alkyl group substituted with one or more carboxy, halo, diazo or epoxy groups, or $R^2$ is a divalent 3- to 5-membered hydrocarbon group bonded to two different, nonadjacent carbon atoms of the central ring to form an aromatic or alicyclic fused carbon ring or multiples thereof with the central ring.

Particularly preferred protonic acids are those of structure III or IV (where appropriate) wherein p is an integer of 0 to 4 and q is an integer of 1 to 3 provided that the sum of p and q is 5 (structure III), $R^1$ alkyl, alkenyl or alkoxy as defined above having from 6 to 14 carbon atoms, or arylalkyl as defined above wherein the alkyl portion has from 4 to 14 carbon atoms, or an alkyl group having from 6 to 14 carbon atoms substituted with one or more carboxy, halo, diazo or epoxy groups. $R^2$ is the same or different at each occurrence and is alkyl, alkoxy or alkylsulfonyl as defined above having from 4 to 14 carbon atoms, or an alkyl group substituted with one or more halo groups, oxo, or a divalent 1- to 3-membered hydrocarbon forming a fused ring with the central ring in structure III or IV.

Representative useful protonic acids include, but are not limited to, 4-dodecylbenzenesulfonic acid, 10-camphorsulfonic acid (L, D or L,D mixtures), methanesulfonic acid, ethanesulfonic acid, hexanesulfonic acid, octanesulfonic acid, trifluoromethanesulfonic acid, $C_8F_{17}$-sulfonic acid, 3-hydroxypropanesulfonic acid, trichlorobenzenesulfonic acid, 2-hydroxy-4-methoxybenzophenonesulfonic acid, dioctylsulfosuccinate, p-toluenesulfonic acid, 4-ethylbenzenesulfonic acid, m-xylene-4-sulfonic acid, m-nitrobenzenesulfonic acid, o-anisidine-5-sulfonic acid, 4-morpholineethanesulfonic acid, p-chlorobenzenesulfonic acid, p-hydroxybenzenesulfonic acid, 4-nitrotoluene-2-sulfonic acid, dinonylnaphthalenesulfonic acid, 3-pyridinesulfonic acid, and p-polystyrenesulfonic acid. 10-Camphorsulfonic acid (single isomers or the racemic mixture) is the most preferred protonic acid because it solubilizes the polyaniline well in the preferred binders and solvents described below.

The amount of protonic acid used with the polyaniline can vary depending upon the degree of conductivity desired for a given use. In general, sufficient amounts are used to provide a complex having an electrical conductivity of at least about $10^{-4}$/ohm-cm. Stated another way, the amount of protonic acid is generally sufficient to provide at least one proton for every two repeating units of aniline in the polyaniline, or to protonate 50% of the nitrogens in the polyaniline. The more protonic acid used, generally the higher the conductivity.

The polyaniline-protonic acid complex is dissolved or solubilized in a first solvent which is defined by the well known Hansen solubility parameters. These parameters are described, for example, in Brandrup & Immergut (Eds.), *Polymer Handbook,* 3rd Edition, John Wiley & Sons, 1989, Section VII. Specifically, this solvent (or mixture thereof) has a Hansen polar solubility parameter in the range of from about 12 to about 18 $MPa^{1/2}$, and preferably in the range of from about 13 to about 17 $MPa^{1/2}$. Also, the solvent or mixture thereof has a Hansen hydrogen bonding solubility parameter of from about 5 to about 14 $MPa^{1/2}$, and preferably from about 6 to about 13 $MPA^{1/2}$. The value of these parameters for a given solvent or mixture of solvents can be readily determined by consulting suitable reference works, or by combining weighted mole fractions to calculate average solubility parameters for solvent mixtures.

Particularly useful first solvents or mixtures thereof, include, but are not limited to, dimethylsulfoxide, a blend of γ-butyrolactone and a lower alcohol (such as methanol, ethanol or butanol), a blend of propylene carbonate or ethylene carbonate and a lower alcohol (as noted above), a blend of propylene carbonate, ethylene carbonate and a lower alcohol (as noted above), N-methylpyrrolidone, or any mixtures of these solvents. In the blends, the noted solvents are present in any suitable weight ratio as long as the average Hansen solubility parameters are within the noted ranges. For example, some of the individual solvents of the blends have solubility parameters outside the noted ranges, but the average solubility parameters of their blends are within the ranges.

Preferred first solvents used in this invention are dimethylsulfoxide, a 50:50 to 95:5 blend (by weight) of γ-butyrolactone with methanol or ethanol, a 50:50 to 95:5 blend (by weight) of propylene carbonate with methanol or ethanol, a 50:50 to 80:20 blend (by weight) of ethylene carbonate with methanol or ethanol, and N-methylpyrrolidone. Most preferred are dimethylsulfoxide and N-methylpyrrolidone. A preferred blend is 66:34 weight ratio of ethylene carbonate and methanol.

The complex of polyaniline and protonic acid is generally dissolved in the first solvent in an amount of up to about 2% solids, and preferably at from about 0.5 to about 1% solids.

The actual amount is dependent upon many factors including the method of making the polymer (for example, in situ), the specific polyaniline, protonic acid and first solvent.

One or more film-forming binders are included in the compositions of this invention. These materials are generally polymeric or colloidal materials that can be cast to form thin, freestanding films or extruded into films that are coherent and retain their shape, and preferably are not brittle when bent.

A wide variety of film-forming binders are useful as one skilled in the art would readily appreciate. Thus, the materials listed herein are representative only, and not meant to be limiting in any way. Blends of binders can also be used. Examples include methyl or ethyl methacrylate homo- and copolymers, ethyl methacrylate homo- and copolymers, polyvinyl acetate, styrene-olefin copolymers (such as styrene-butadiene, styrene-ethylene and styrene-propylene copolymers of various weight ratios), polyurethanes, polyvinyl formal, polyvinyl butyral, polycarbonates, cellulose esters (such as cellulose diacetate, cellulose triacetate and mixtures thereof), acrylamide homo- and copolymers, cellulose ethers, fluorinated ethyl vinyl ether polymers, vinyl pyrrolidone homo- and copolymers, ionic polyesters, ionic acrylonitrile-vinylidene chloride polymers, methylcellulose, cellulose nitrate, gelatin (including alkali- or acid-treated gelatins), gelatin derivatives (such as acetylated gelatin and phthalated gelatin), polysaccharides (such as dextran, gum arabic and zein), or gelatin-like synthetic polymers [such as those described in *Research Disclosure,* supra, paragraph II(A) and references cited therein], and U.S. Pat. No. 3,615,624 of Smith et al, U.S. Pat. No. 4,315,072 of Fox et al, U.S. Pat. No. 4,713,320 of Maskasky, U.S. Pat. No. 4,942,120 of King et al and U.S. Pat. No. 4,990,440 of Moll et al, incorporated herein by reference.

Preferred film-forming binders include methyl and ethyl methacrylate homo- and copolymers, cellulose esters (such as a blend of cellulose diacetate and cellulose triacetate), polycarbonates and polyvinyl formal. The methyl methacrylate polymers are most preferred.

The film-forming binder is dissolved in a second solvent which can be a single component or a mixture of miscible solvents. In some instances, the second solvent is the same as the first solvent defined above. In most instances, however, the first and second solvents are different. In such cases, useful second solvents include, but are not limited to, water, dichloromethane (or other chlorinated solvents such as 1,1,1-trichloromethane and chloroform), a lower alcohol (such as methanol, ethanol or butanol), acetone, methylacetoacetate, glycol ethers or a mixture of any of these solvents (such as a mixture of dichloromethane, acetone and methylacetoacetate). Preferred second solvents are water, dichloromethane (or other chloronated solvents). Most preferred is dichloromethane.

The amount of film-forming binder in the second solvent can vary widely depending upon the solvent, binder and other requirements of a given composition. Generally, however, the binder is present in an amount of less than about 5 weight percent, with from about 1 to about 4 weight percent being preferred.

The composition of this invention can be prepared by mixing the first solvent containing the polyaniline-protonic acid complex with the second solvent containing the film-forming binder. In the situations where the two solvents are the same, either the complex or binder can be added to the other in the desired proportions.

The composition can contain other materials besides those noted above. For example, it can contain coating aids, surfactants, biocides, dyes (such as antihalation dyes), dispersing aids, lubricants, wetting aids, matte particles, pigments, hardeners, and other materials, in amounts readily apparent to one skilled in the art. Preferably, the composition also includes uniformly dispersed therein, ferromagnetic particles in an amount of up to about 5% of the total solids.

The coating composition of this invention contains a limited amount of all solids (both necessary and optional components). Generally, the amount of solids is less than or equal to about 10% with at least 90% of that amount being contributed by the film-forming binder and polyaniline-protonic acid complex defined herein. Preferably, the total solids is from about 0.1 to about 6 weight %, and from about 1 to about 4 weight % is more preferred.

The weight ratio of the film-forming binder to the polyaniline-protonic acid complex can vary widely depending upon the type of material used as the support. Generally, it is at least about 1:1. For example, when a polyester is used as the support material, the weight ratio is at least about 9:1, and preferably, it is from about 10:1 to about 99:1. When a cellulose ester (such as cellulose acetate) is used as the support material, the ratio can be as low as 1:1, and preferably from about 2:1 to about 99:1.

Where the first and second solvents are different, the weight ratio of the second solvent to the first solvent is at least about 5:1, and more preferably, it is from about 7:1 to about 19:1.

A most preferred electrically conductive coating composition of this invention includes unsubstituted polyaniline, 10-camphorsulfonic acid (either or both stereoisomers) as the protonic acid to form the complex, dimethylsulfoxide as the first solvent, dichloromethane as the second solvent and polymethyl methacrylate as the film-forming binder. This composition has from about 1 to about 4% solids, the ratio of second solvent to first solvent is from about 7:1 to about 19:1, and the weight ratio of the binder to the complex is from about 19:1 to about 99:1.

To form the electrically conductive or imaging elements described above, the electrically conductive coating composition is applied to a suitable support in any suitable manner (such as by hand or machine coating techniques or extrusion), and dried to remove the solvents. Coating techniques are well known and include skim pan/air knife coating, roller coating, gravure coating, curtain coating, bead coating or slide hopper coating techniques.

The dry coverage of the resulting layer is at least 0.15 g/m$^2$, and is preferably from about 0.5 to about 2 g/m$^2$, in each instance (that is, each layer). The composition can be applied to the support in various configurations depending upon the requirements of the specific elements. It can be applied to form a uniform coating, or it can be applied in regions such as stripes, dots, patterns and the like. It can be applied directly to the support, or on a support already having intermediate layers. The electrically conductive layer can also be overcoated with one or more layers, as described above.

In the instance of preparing photographic elements, the electrically conductive coating composition can be applied to a polymeric film support during support manufacture after the polymer has been oriented to form an antistatic layer. The composition can also be applied as a subbing layer on the sensitized emulsion side of the support, on the opposite side, or on both sides. Alternatively, the antistatic layer can be part of a multi-component curl control layer on the support opposite the photographic emulsion layers.

In the case of photographic elements for direct or indirect x-ray applications, the antistatic layer can be applied as a subbing layer on either or both sides of the film support. In one type of photographic element, the antistatic subbing layer is applied to only one side of the support and the photographic emulsion layer(s) are applied to both sides of the support. In another type of element, an emulsion layer is on only one side of the support and a pelloid containing gelatin layer is on the other side of the support. The antistatic layer can be applied under either or both of those layers. Additional optional layers can also be present. In still another embodiment for x-ray applications, the antistatic subbing layer can be applied either under or over a gelatin-containing subbing layer containing an antihalation dye or pigment. Alternatively, both antihalation and antistatic functions can be combined in a single layer containing the polyaniline-protonic complex and binder as defined above, as well as an antihalation dye or pigment.

Unless otherwise indicated, as used herein to identify various amounts, conditions, times or dimensions, the term "about" refers to a variability of ±10% of the indicated value. For temperatures, the term "about" refers to a variability of ±5° C.

The following examples are used to illustrate the practice of the invention, but are not intended to limit its scope in any way. Unless otherwise indicated, percentages are by weight.

Materials and Methods for Examples:

Multistep Preparation of Camphor Sulfonic Acid Solubilized Polyaniline

A solution of ammonium persulfate (11.5 g, 0.0504 mol) dissolved in hydrochloric acid (1 molar, 200 ml) was added to a solution (20 ml) of aniline (0.0219 mol) dissolved in hydrochloride acid (1 molar, 300 ml). Both solutions were precooled to 0° C. and the temperature was then held at 0–5° C. during the addition and for a period of 2 hours afterward while the reaction mixture was stirred. The resulting product (emeraldine hydrochloride) was filtered from the reaction medium and washed with hydrochloric acid (1 molar, 500 ml). The resulting wet filter cake was suspended in ammonium hydroxide (0.1 molar, 500 ml), and stirred at room temperature for 24 hours. The pH of the solution was checked periodically and adjusted with concentrated ammonium hydroxide to keep it above 8. After 24 hours, the reaction product was filtered and resuspended in ammonium hydroxide (0.1 molar, 500 ml), and the solution was stirred for 1 hour. The reaction product was filtered, and the resulting filter cake was washed with water (500 ml) and acetone (250 ml), and air dried. The dried material was then oven dried at 80° C. for 14 hours. The yield was 3.2 g of emeraldine base.

Emeraldine base (1 g) was added to a solution (40 ml) of 10-camphorsulfonic acid (5 g) in 1-methoxy-2-propanol (available as DOWANOL PM from Dow Chemical Co.). The resulting mixture was heated at 60–70° C. for 20 hours, cooled and filtered to yield 1.6 g of camphorsulfonic acid solubilized polyaniline as a dark green powder.

One-Step Preparation of Camphorsulfonic Acid Solubilized Polyaniline

Aniline (1.5 ml) was added to a solution of 10-camphorsulfonic acid (8.82 g) in water (40 ml). Ammonium persulfate (0.88 g) was added to the solution and reaction mixture was stirred at room temperature for 2 hours. The reaction product was filtered and washed with water, and the filter cake was vacuum dried to yield 0.63 g of camphorsulfonic acid solubilized polyaniline as a dark green powder.

Preparation Using Commercial Polyaniline

A sample of VERSICON™ polyaniline (5 g, Allied Signal) was suspended in ammonium hydroxide (0.1 molar, 1000 ml). The suspension was stirred at room temperature for 24 hours. The resulting reaction product was then filtered, and the filter cake was washed with water (250 ml) and air dried to yield 3.25 g of dark blue powder.

The powder was then added to a solution of 10-camphorsulfonic acid (16.2 g) in 1-methoxy-2-propanol (130 ml). The reaction mixture was stirred at 70° C. for 24 hours, and cooled. The reaction product was filtered, and the filter cake was then washed with 1-methoxy-2-propanol (250 ml), and over dried at 60° C. to yield 4.5 g of camphorsulfonic acid solubilized polyaniline as a dark green powder.

Binders Used in Coatings

Several binder materials were used in the various examples described below. These binder materials are listed in Table I below.

TABLE I

| POLYMER BINDER | COMPOSITION/SOURCE |
|---|---|
| P-1 | Poly(methyl methacrylate), ICI ELVACITE 2041 |
| P-2 | Poly(methyl methacrylate), ICI ELVACITE 2010 |
| P-3 | Poly(ethyl methacrylate), ICI ELVACITE 2042 |
| P-4 | Polyvinyl formal, Chisso Corporation VINYLEC E |
| P-5 | Polyvinyl butyral, Monsanto Co. BUTVAR 76 |
| P-6 | Fluoroethylene vinyl ether copolmer, Asahi Glass Co. LF710F |
| P-7 | Polycarbonate, Scientific Polymer Products |
| P-8 | Cellulose diacetate, Eastman Chemicals Co. CA 398-3 |
| P-9 | Poly(vinyl pyrrolidone), Scientific Polymer Products 40kD |
| P-10 | Polyester ionomer dispersion, Eastman Chemicals Co. AQ29D |
| P-11 | Poly(acrylonitrile-co-vinylidene chloride-co-acrylic acid) latex dispersion, in-house |
| P-12 | Poly(acrylonitrile-co-vinylidene chloride-co-trimethyl-ammonium ethylmethacrylate methosulfate) latex dispersion, in-house |
| P-13 | Methylcellulose, Dow Chemical |
| P-14 | Hydroxypropyl methylcellulose, Dow Chemical |
| P-15 | Gelatin |
| P-16 | Cellulose nitrate 40–60 SNPE |

EXAMPLES 1–7

Preparation of Various Electrically Conductive Elements

Several elements of this invention were prepared to evaluate the usefulness of various binders in the electrically conductive coating composition.

All elements were prepared by applying the electrically conductive coating compositions to oriented polyethylene terephthalate film supports (0.01 cm thickness) on which had been coated a conventional subbing layer of poly (acrylonitrile-co-vinylidene chloride-co-acrylic acid). The total layer coverage was 65 mg/ft$^2$ (702 mg/m$^2$).

Each coating composition comprised 1%, 7.5% of which was a solubilized complex of polyaniline and camphorsulfonic acid for Examples 1–6 (10% for Example 7). The rest of the solids were binder. The complex was dissolved in dimethylsulfoxide while the second coating solvent was dichloromethane, used at a weight ratio of dichloromethane to dimethylsulfoxide of 88:12.

The water electrode resistivity of the coated layer was measured by applying 200 volts (direct current) across a sample of the element having a specified geometry between two electrodes consisting of a salt water solution. The resistivity measurements were converted to sheet resistivity. Measurement of surface electrode resistivity was recorded using a Trek Model 150 surface resistivity meter (Trek, Inc., Medina, N.Y.) in accordance with ASTM standard D257-78. In all cases, the surface and water electrode resistivity measurements were in agreement. The water electrode resistivities [log(resistivity) in ohms/square], the binders used in the coating compositions and coating appearance are listed in Table II below.

TABLE II

| EXAMPLE | BINDER | APPEARANCE | RESISTIVITY |
|---|---|---|---|
| 1 | P-2 | clear, light green | >13 |
| 2 | P-3 | hazy, slightly mottled, bluish-green | 8.8 |
| 3 | P-4 | clear, green | 8.4 |
| 4 | P-5 | hazy, light green | 9.2 |
| 5 | P-7 | clear, green | 7.5 |
| 6 | P-8 | clear, green | 7.9 |
| 7 | P-6 | slightly hazy, green | 7.6 |

EXAMPLES 8–16

Electrically Conductive Elements Prepared Using Various Solvents

In these examples, the electrically conductive coating compositions of this invention were prepared using various solvent combinations. In other respects, the compositions were like those described for Examples 1–6. The elements were prepared as described in those examples.

Table III lists the binders and solvents used, as well as the resulting surface resistivities (determined as described above). In the "Solvents" column, the first listed solvent is the binder solvent and the second listed solvent (or blend) is that for the polyaniline camphorsulfonic acid complex.

TABLE III

| Example | Binder | Solvents (weight ratio) | Resistivity (log ohms/square) |
|---|---|---|---|
| 8 | P-7 | Dichloromethane:dimethyl-sulfoxide (88:12) | 7.8 |
| 9 | P-7 | Dichloromethane:blend of ethylene carbonate & methanol (88:4:6) | 8.6 |
| 10 | P-8 | Dichloromethane & methanol blend:dimethylsulfoxide (80:8:12) | 7.9 |
| 11 | P-8 | Dichloromethane & methanol blend:methanol & ethylene carbonate blend (80:8:4:8) | 9.4 |
| 12 | P-8 | Dichloromethane & methanol blend:methanol & γ-butyrolactone blend (80:8:2:10) | 9.9 |
| 13 | P-8 | dichloromethane & acetone blend:diethylsulfoxide (40:48:12) | >13 |
| 14 | P-4 | dichloromethane:di-methylsulfoxide (88:12) | 8.5 |
| 15 | P-4 | dichloromethane:blend of methanol & ethylene carbonate (88:5:7) | 8.8 |
| 16 | P-4 | dichloromethane:blend of methanol & γ-butyrolactone (88:2:10) | >13 |

EXAMPLE 17–22

Electrically Conductive Elements Formed Using Water As Coating Solvent

These elements were prepared similarly to those described in Examples 1–6. The electrically conductive coating compositions comprised a polyaniline camphorsulfonic acid complex, and various binders. The percent solids was 1%, 7.5% of which was the complex. The dry coverage of the coating composition was 30 mg/ft$^2$ (324 mg/m$^2$). Table IV below shows the surface resistivity of the various elements, the various binders and solvents used (first solvent is the binder solvent, and second solvent or blend of solvents is for the complex).

TABLE IV

| Example | Binder | Solvents (weight ratio) | Resistivity (log ohms/square) |
|---|---|---|---|
| 17 | P-12 | Water:blend of methanol & γ-butyrolactone (88:2:10) | 9.3 |
| 18 | P-11 | Water:blend of methanol & ethylene carbonate (88:4.8:7.2) | >13 |
| 19 | P-10 | Water:blend of methanol & γ-butyrolactone (88:2:10) | >13 |
| 20 | P-9 | Water:blend of methanol & γ-butyrolactone (88:2:10) | 10.9 |
| 21 | P-9 | Water:blend of methanol & ethylene carbonate (88:4.8:7.2) | 9 |
| 22 | P-9 | Water:dimethyl- sulfoxide (88:12) | 9.8 |

EXAMPLE 23

Evaluation of Electrically Conductive Elements

Several of the elements prepared as described above were evaluated for their resistance to processing with strong acids or bases, such as may occur in conventional photographic processing methods. Specifically, either of two conventional processing protocols were used: (1) Eastman Color Print Process used to process conventional motion picture print films, and (2) Process C-41 used to process conventional color negative films.

Table V describes the results, that is, the change in surface electrical conductivity [log(resistivity) in ohms/square] with such processing.

TABLE V

| Element (Example) | Resistivity Before Processing | Resistivity After Processing |
|---|---|---|
| 2 | 8.8 | 11.7 |
| 5 | 9.2 | >14 |
| 7 | 7.6 | 10.1 |
| 8 | 7.8 | 8.5 |
| 10 | 7.9 | 9.2 |
| 14 | 8.5 | 8.5 |
| 15 | 8.8 | 10.2 |
| 17 | 9.3 | >14 |
| 22 | 9.8 | >14 |

EXAMPLES 24–25

Electrically Conductive Elements Using Acetate Supports

Two electrically conductive coating compositions of this invention were prepared as described in Examples 1–6 above using two different binders. The percent solids for these examples were 0.15% (Example 24) and 0.2% (Example 25) with the solubilized polyaniline camphorsulfonic acid complex representing 33% of the solids for Example 24 and 50% of the solids for Example 25. The overall coating coverage on the cellulose acetate supports was 3–4 mg/ft$^2$ (32–43 mg/m ) for Example 24, and 5–6 mg/ft² (53–65 mg/m²) for Example 25. Table VI below shows the surface resistivity [log(resistivity) in ohms/ square] results for the elements.

TABLE VI

| Element (Example) | Binder | Appearance | Resistivity |
|---|---|---|---|
| 24 | P-16 | Clear, light green | 8.9 |
| 25 | P-8 | Clear, light green | 8.5 |

EXAMPLES 26–29

Electrically Conductive Elements Having Magnetic Recording Layers

These examples demonstrate the incorporation of several embodiments of antistatic compositions of this invention into magnetic recording layers of elements.

The antistatic compositions were prepared by dissolving polyaniline and camphorsulfonic acid in a suitable solvent or solvent blend as described in previous examples. This solution was then added to a 4% solution of a blend of binders (cellulose diacetate and cellulose triacetate at 93:7 weight ratio) in a mixture of solvents, dichloromethane, acetone and methylacetoacetate (70:25:5). Particles of an intermediate magnetic oxide (cobalt doped γ-iron oxide) were added to the resulting solution along with conventional surfactants, coating aids and additives. The final solids of the resulting dispersion was about 2.7%. The antistatic composition comprised 7.2% of the total solids.

The dispersions were machine coated onto a conventional subbed polyethylene terephthalate support to provide a single antistatic/magnetic recording layer having a final dry coverage of about 115–125 mg/ft² (1.24–1.35 g/m²). The dry coverage of antistatic composition in this layer was 8–10 mg/ft² (86.4–108 (mg/m²).

The surface electrode resistivity and water electrode resistivity of each sample were measured in the same manner as described in Examples 1–7 above and reported as log (resistivity) in ohms/square in Table VII low.

TABLE VII

| Example | Solvents (weight ratio) | Coating Quality | Resistivity |
|---|---|---|---|
| 26 | First blend*:dimethylsulfoxide (73:27) | Fair | 8.3 |
| 27 | First blend*:blend of ethylene carbonate & methanol (73:18:9) | Good | 8.0 |
| 28 | First blend*:Blend of γ-butyrolactone & methanol (73:23:4) | Good | 10.0 |
| 29 | First blend*:Blend of propylene carbonate & methanol (73:19:8) | Good | 8.8 |

*First blend was a 70:25:5 mixture of dichloromethane, acetone and methylacetonacetate.

The invention has been described in detail with particular reference to preferred embodiments thereof, but it will be understood that variations and modifications can be effected within the spirit and scope of the invention.

We claim:

1. An electrically conductive element comprising a support and having thereon in at least one region, an electrically conductive layer formed from application of an electrically conductive coating composition, said electrically conductive layer being present on said support at a dry coverage of at least 150 mg/m², said electrically conductive coating composition comprising a solution of:
   a) a complex of a polymeric polyaniline and a protonic acid that has a counter-ion that imparts conductivity to said composition,
   said complex being dissolved in a first solvent that has a Hansen polar solubility parameter of from 13 to about 17 MPa$^{1/2}$, and a Hansen hydrogen bonding solubility parameter of from about 5 to about 14 MPa$^{1/2}$, and
   b) a film-forming binder dissolved in a second solvent, wherein said first and second solvents are the same or different,
   provided that the total solids in said composition is less than or equal to about 10 weight % of the total composition, and the weight ratio of said binder to said complex is at least about 2:1,
   wherein said first solvent is dimethylsulfoxide, a g-butyrolactone/lower alcohol blend, a propylene carbonate/lower alcohol blend, an ethylene carbonate/lower alcohol blend, a propylene carbonate/ethylene carbonate/lower alcohol blend, or a mixture thereof, wherein said lower alcohol has up to 4 carbon atoms,
   said second solvent is water, a chlorinated solvent, or a mixture of a chlorinated solvent with a lower alcohol or acetone, wherein said lower alcohol has up to 4 carbon atoms,
   the weight ratio of said second solvent to said first solvent is from about 5:1 to about 19:1, and
   said electrically conductive layer having a resistivity of less than or equal to 10.9 log ohms/square.

2. The element of claim 1 wherein said support is a polymeric film support.

3. The element of claim 1 wherein said support is a resin-coated paper.

4. The element of claim 1 wherein said electrically conductive layer has been applied directly to said support.

5. The element of claim 1 wherein one or more layers are applied over said electrically conductive layer.

6. The element of claim 5 wherein at least one of said layers applied over said electrically conductive layer is a magnetic recording layer.

7. The element of claim 1 wherein having one or more layers between said support and said electrically conductive layer.

8. The element of claim 7 wherein at least one of said layers between said support and said electrically conductive layer is a magnetic recording layer.

9. The element of claim 1 wherein said electrically conductive layer is also a magnetic recording layer comprising ferromagnetic particles.

10. The element of claim 1 further comprising one or more imaging layers on the same side of said support as said electrically conductive layer.

11. The element of claim 1 further comprising one or more imaging layers on the opposite side of said support as said electrically conductive layer.

12. The element of claim 1 wherein comprising one or more photographic silver halide emulsion layers.

13. The element of claims wherein:
   said film-forming binder is a methyl methacrylate polymer, an ethyl methacrylate polymer, polyvinyl acetate, a styrene-olefin copolymer, a polyurethane, polyvinyl formal, polyvinyl butyral, polycarbonate, a cellulose ester, a cellulose ether, an acrylamide polymer, a fluorinated vinyl ether polymer, a vinyl pyrrolidone polymer, an ionic polyester, an ionic acrylonitrile-vinylidene chloride polymer, methylcellulose, cellulose nitrate, gelatin, a gelatin derivative, or a polysaccharide, said polyaniline having a number average molecular weight of at least about 1000 daltons, and is prepared by polymerizing an aniline having the structure I:

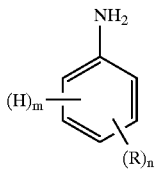

wherein R is the same or different at each occurrence and is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo or cyano, or any two R groups, taken together, are an alkylene group or alkenylene group completing a 3- to 7-membered aromatic or alicyclic ring fused to the central ring of structure I, and having carbon, nitrogen, sulfur or oxygen atoms or a sulfinyl group, m is an integer of from 1 to 5, and n is an integer of from 0 to 4, provided that the sum of m and n is 5, and said protonic acid has any of the structures II:

A-R$^1$

III:

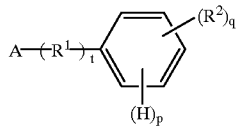

or

IV:

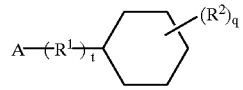

wherein A is sulfonic acid,

R$^1$ is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo or cyano, or a 3- to 7-membered heterocyclic ring having carbon, nitrogen, sulfur or oxygen atoms, R' is an alkylene group of 1 to 10 carbon atoms, R$^2$ is the same or different at each occurrence and is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkyl-sulfonyl group, an aryl group, an arylthio group, an arylsulfinyl group, an alkoxycarbonyl group, an aryloxycarbonyl group, an arylsulfonyl group, carboxy, halo, oxo or cyano, or R$^2$ is a divalent aliphatic group bonded to different, non-adjacent carbon atoms of the central ring to form an aromatic or alicyclic ring fused to the central ring of structure III or IV, and having carbon, nitrogen, sulfur or oxygen atoms or a sulfinyl group, p is an integer of from 1 to 5, q is an integer of from 0 to 4, provided that the sum of m and n is 5, and t is 0 or 1.

14. The element of claim 13 wherein said protonic acid is 10-camphorsulfonic acid, said first solvent is dimethylsulfoxide, said second solvent is dichloromethane, and said film-forming binder is polymethyl methacrylate.

15. An imaging element comprising a support having:

one or more imaging layers, and on the same, opposite or both sides of said support, an electrically conductive layer formed from application of an electrically conductive coating composition, said electrically conductive layer being present on said support in each instance at a dry coverage of at least 150 mg/m$^2$, said electrically conductive coating composition comprising a solution of:

a) a complex of a polymeric polyaniline and a protonic acid that has a counter-ion that imparts conductivity to said composition, said complex being dissolved in a first solvent that has a Hansen polar solubility parameter of from 13 to about 17 MPa$^{1/2}$, and a Hansen hydrogen bonding solubility parameter of from about 5 to about 14 MPa$^{1/2}$, and b) a film-forming binder dissolved in a second solvent, wherein said first and second solvents are the same or different, provided that the total solids in said composition is less than or equal to about 10 weight % of the total composition, and the weight ratio of said binder to said complex is at least about 2:1.

16. The element of claim 15 wherein:

said one or more imaging layers are photographic silver halide emulsion layers, said support is a polymeric film support, said polyaniline having a number average molecular weight of at least about 1000 daltons, and is prepared by polymerizing an aniline having the structure I:

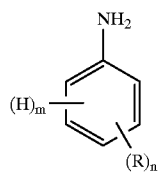

wherein R is the same or different at each occurrence and is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo or cyano, or any two R groups, taken together, are an alkylene group or alkenylene group completing a 3- to 7-membered aromatic or alicyclic ring fused to the central ring of structure I, and having carbon, nitrogen, sulfur or oxygen atoms or a sulfinyl group, m is an integer of from 1 to 5, and n is an integer of from 0 to 4, provided that the sum of m and n is 5, and said protonic acid has any of the structures II:

A-R$^1$

III:

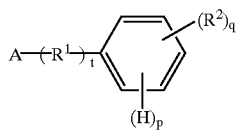

or
IV:

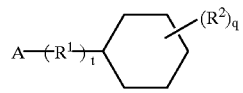

wherein A is sulfonic acid,

R$^1$ is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo or cyano, or a 3- to 7-membered heterocyclic ring having carbon, nitrogen, sulfur or oxygen atoms, R' is an alkylene group of 1 to 10 carbon atoms, R$^2$ is the same or different at each occurrence and is an alkyl group, an alkenyl group, an alkoxy group, a cycloalkyl group, a cycloalkenyl group, an alkanoyl group, an alkylthio group, an aryloxy group, an alkylthioalkyl group, an alkylaryl group, an arylalkyl group, an alkylsulfinyl group, an alkoxyalkyl group, an alkylsulfonyl group, an aryl group, an arylthio group, an arylsulfinyl group, an alkoxycarbonyl group, an aryloxycarbonyl group, an arylsulfonyl group, carboxy, halo, oxo or cyano, or R$^2$ is a divalent aliphatic group bonded to two different, nonadjacent carbon atoms of the central ring to form an aromatic or alicyclic ring fused to the central ring of structure III or IV, and having carbon, nitrogen, sulfur or oxygen atoms or a sulfinyl group, p is an integer of from 1 to 5, q is an integer of from 0 to 4, provided that the sum of m and n is 5, and t is 0 or 1.

17. The element of claim 16 wherein said protonic acid is hexanesulfonic acid, octanesulfonic acid, 4-dodecylbenzenesulfonic acid, 10-camphorsulfonic acid, ethylbenzenesulfonic acid, p-toluenesulfonic acid, o-anisidine-5-sulfonic acid, p-chlorobenzenesulfonic acid, hydroxybenzenesulfonic acid, trichlorobenzenesulfonic acid, 2-hydroxy-4-methoxybenzophenonesulfonic acid, 4-nitrotoluene-2-sulfonic acid, dinonylnaphthalenesulfonic acid, or 4-morpholineethanesulfonic acid, methanesulfonic acid, ethanesulfonic acid, trifluoromethanesulfonic acid, $C_8F_{17}$-sulfonic acid, 3-hydroxypropane sulfonic acid, dioctylsulfosuccinate, 3-pyridinesulfonic acid or p-polystyrenesulfonic acid.

18. The element of claim 16 which is a color photographic film wherein said support is composed of polyethylene terephthalate or polyethylene naphthalate, said protonic acid is 10-camphorsulfonic acid, said organic solvent is dimethylsulfoxide, said second solvent is dichloromethane, said film-forming binder is polymethyl methacrylate.

19. The element of claim 16 further comprising a transparent magnetic recording layer on said support opposite the side having said photographic silver halide emulsion layers, said magnetic recording layer comprising a ferromagnetic iron oxide with or without cobalt or zinc in solid solution or surface treated, or a chromium dioxide with or without metallic elements or halogen atoms in solid solution.

20. The element of claim 19 wherein said magnetic recording layer comprises cobalt doped γ-iron oxide particles.

21. The element of claim 1 wherein the total solids in said electrically conductive coating composition is from about 0.1 to about 6 weight % of the total composition.

22. The element of claim 1 wherein the weight ratio of said binder to said complex is from about 10:1 to about 99:1.

23. The element of claim 1 wherein said first and second solvents are different and the weight ratio of said second solvent to said first solvent is from about 7:1 to about 19:1.

24. The element of claim 1 wherein said film-forming binder is a methyl methacrylate polymer, an ethyl methacrylate polymer, polyvinyl acetate, a styrene-olefin copolymer, a polyurethane, polyvinyl formal, polyvinyl butyral, polycarbonate, a cellulose ester, a cellulose ether, an acrylamide polymer, a fluorinated vinyl ether polymer, a vinyl pyrrolidone polymer, an ionic polyester, an ionic acrylonitrile-vinylidene chloride polymer, methylcellulose, cellulose nitrate, gelatin, a gelatin derivative, or a polysaccharide.

25. The element of claim 1 wherein said binder is present in an amount of up to about 5 weight % of the total composition.

26. The element of claim 1 wherein said protonic acid is hexanesulfonic acid, octanesulfonic acid, 4-dodecylbenzenesulfonic acid, 10-camphorsulfonic acid, ethylbenzenesulfonic acid, p-toluenesulfonic acid, o-anisidine-5-sulfonic acid, p-chlorobenzenesulfonic acid, hydroxybenzenesulfonic acid, trichlorobenzenesulfonic acid, 2-hydroxy-4-methoxybenzophenonesulfonic acid, 4-nitrotoluene-2-sulfonic acid, dinonylnaphthalenesulfonic acid, 4-morpholineethanesulfonic acid, methanesulfonic acid, ethanesulfonic acid, trifluoromethanesulfonic acid, $C_8F_{17}$-sulfonic acid, 3-hydroxypropanesulfonic acid, dioctylsulfosuccinate, 3-pyridinesulfonic acid or p-polystyrenesulfonic acid.

* * * * *